(12) United States Patent
Chatterjee et al.

(10) Patent No.: US 9,864,965 B2
(45) Date of Patent: Jan. 9, 2018

(54) MULTI-DIMENSIONAL TARGET SETTING APPLICATION

(71) Applicant: SAP SE, Walldorf (DE)

(72) Inventors: Swarnava Chatterjee, Varanasi (IN); Sunny Lakhmani, Lucknow (IN); Ashwin K S, Kocki (IN); Prabhu Jayakumar, Chennai (IN); Vinothkumar Vaithianathan, Puducherry (IN); Monissha M. T Agil, Erode (IN)

(73) Assignee: SAP SE, Walldorf (DE)

( * ) Notice: Subject to any disclaimer, the term of this patent is extended or adjusted under 35 U.S.C. 154(b) by 621 days.

(21) Appl. No.: 14/502,259

(22) Filed: Sep. 30, 2014

(65) Prior Publication Data

US 2016/0092810 A1    Mar. 31, 2016

(51) Int. Cl.
*G06Q 10/06* (2012.01)

(52) U.S. Cl.
CPC .............................. *G06Q 10/0637* (2013.01)

(58) Field of Classification Search
CPC ... G06Q 10/0637; G06Q 10/00; G06Q 10/637
USPC ....................................................... 705/7.29
See application file for complete search history.

(56) References Cited

U.S. PATENT DOCUMENTS

| 9,626,693 B2* | 4/2017 | Smith | G06Q 30/0251 |
|---|---|---|---|
| 2010/0303299 A1* | 12/2010 | Cho | G01B 11/026 |
| | | | 382/106 |
| 2013/0100284 A1* | 4/2013 | Fujii | A61B 5/1113 |
| | | | 348/135 |
| 2014/0180816 A1* | 6/2014 | Mith | G06Q 30/0251 |
| | | | 705/14.55 |
| 2014/0181995 A1* | 6/2014 | Smith | G06F 21/6254 |
| | | | 726/28 |
| 2014/0316886 A1* | 10/2014 | Smith | G06Q 30/0257 |
| | | | 705/14.49 |

* cited by examiner

*Primary Examiner* — Romain Jeanty
(74) *Attorney, Agent, or Firm* — Jones Day

(57) ABSTRACT

Systems, methods, and non-transitory computer-readable mediums having program instructions thereon, provide for creating, storing and utilizing planned target data with a target-setting graphical user application based a cloud-based system. The target-setting application can create multi-dimensional target settings for any HANA or non-HANA based data source. The target-setting application can store planned targets for entities of an organization across varying dimensions and time granularity. Also, the target-setting application generates data access protocol service links of the target data so the target data can be consumed by both HANA and non-HANA based applications.

19 Claims, 13 Drawing Sheets

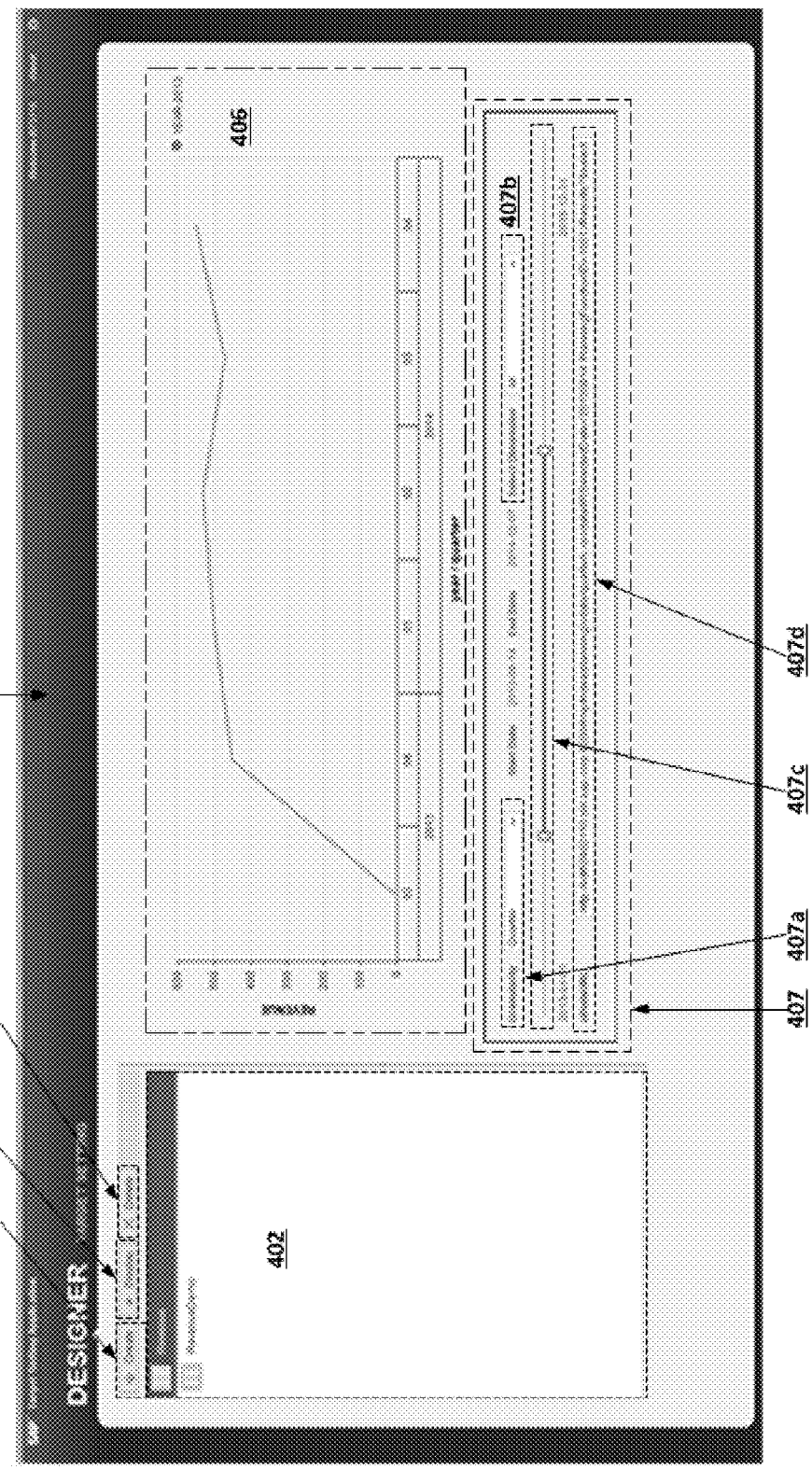

Display Page 410

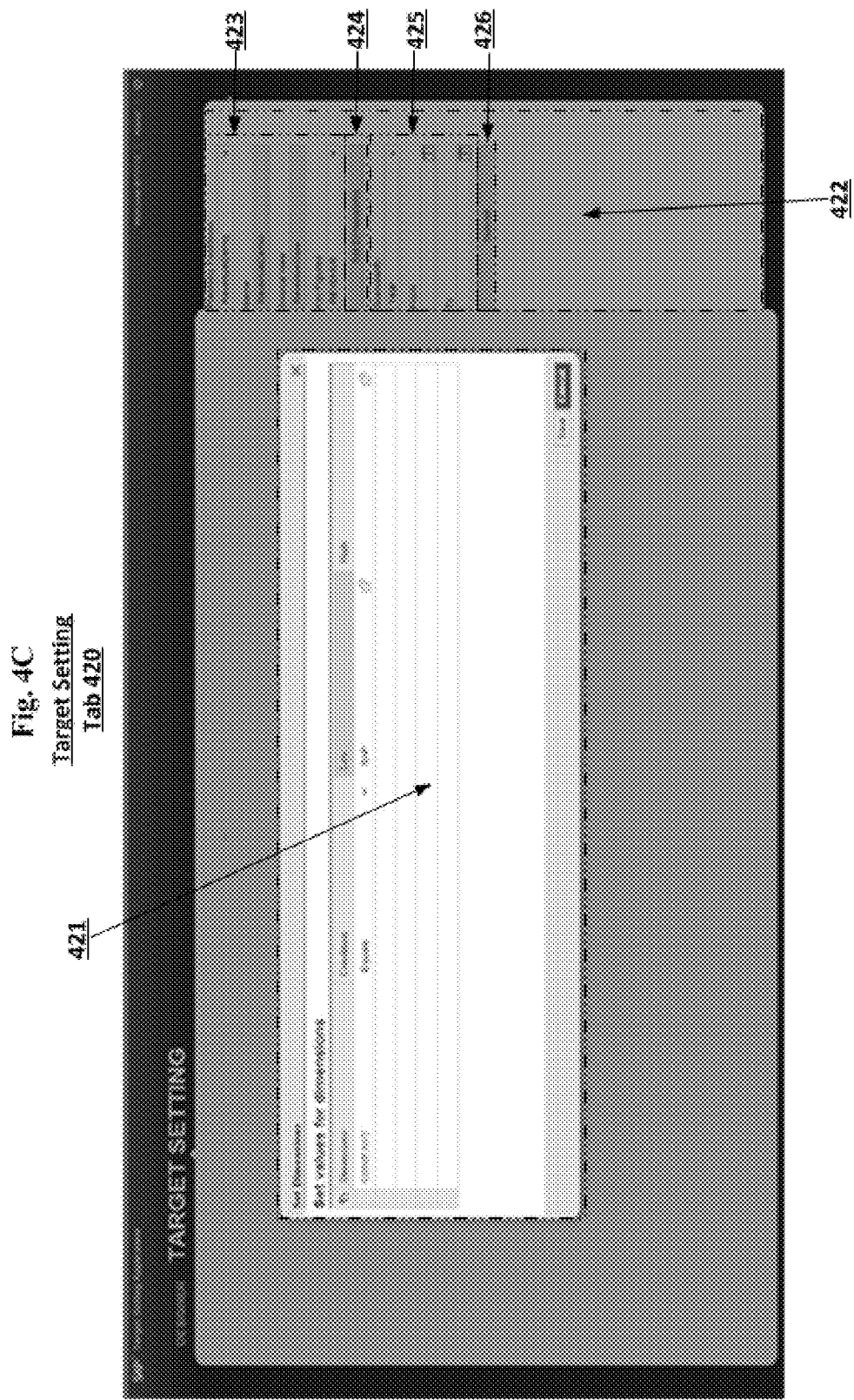

Graph Page 430

Graph Page 430

Graph Page 430

Home Page 401

Graph Page 430

Fig. 5
ODATA based URL 500

MULTI-DIMENSIONAL TARGET SETTING APPLICATION

FIELD

The present disclosure relates generally to the creation and deployment of multi-dimensional target-setting functions using a graphical user interface application.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

FIG. 4A illustrates an embodiment of the home page of the graphical user interface application.

FIG. 4C illustrates an embodiment of a page utilized to provide/modify target values of a dimension as well as the desired time period and granularity.

FIG. 5 illustrates an embodiment of the data access protocol service link (e.g., OData® based URL) generated by the graphical user interface application to be consumed by other applications.

DETAILED DESCRIPTION

Figure 1:
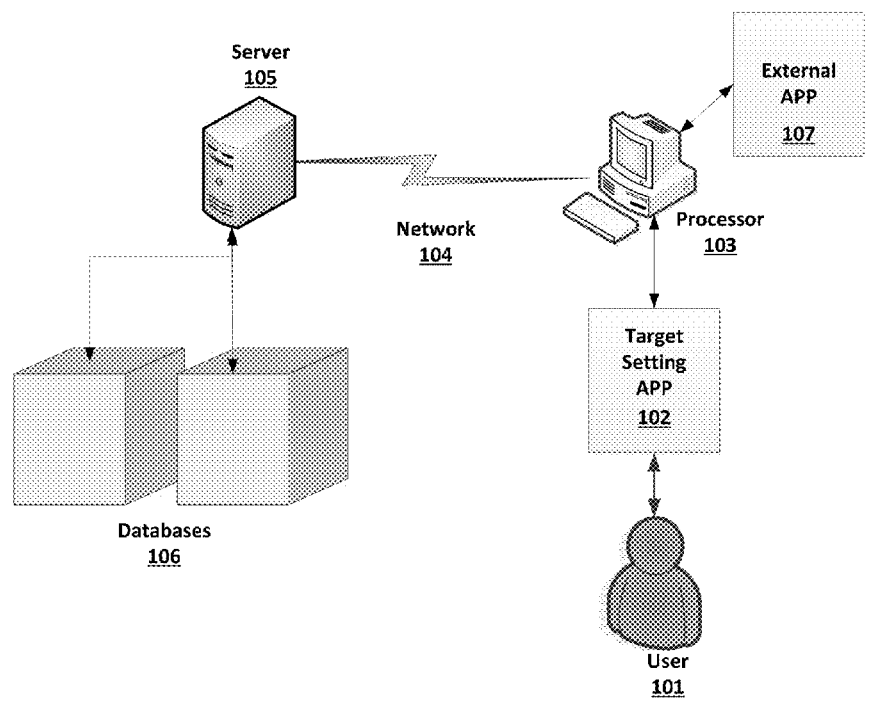
FIG. 1 illustrates an embodiment of a system utilizing the target setting graphical user interface application.

According to an embodiment of the present disclosures, systems, methods, and non-transitory computer-readable mediums having program instructions thereon, provide for creating, storing and utilizing planned target data with a target-setting graphical user application based on a cloud-based system (e.g., SAP® HANA). In an embodiment, some of this target data can be used to define key performance indicators (KPIs) (which require a target value to be set in order to perform a comparison between the actual and target values). In an embodiment, the target-setting application stores planned targets for entities (which can be defined by the user) of an organization across varying dimensions and time granularity. The target values can be for any time range and can be maintained with dimensional hierarchies as well.

In an embodiment, the target-setting application can create multi-dimensional target settings for any HANA or non-HANA based data source. For example, the HANA virtual data models (i.e., Analytical Models like Calculation View and Attribute View) can be used as data sources. Also, non-HANA based data sources can be used as long as the external data source is exposed by an analytical data access protocol service (e.g., an analytical OData® service through SAP® Gateway), wherein the metadata is provided with clear Dimension and Measure segregation. Accordingly, any type of source object can be used for target setting (e.g., tables, views, OData® services and business warehouse (BW) objects). Similarly, in an embodiment, the target-setting application generates data access protocol service links (e.g., OData® based URL) of the target data so the target data can be consumed by both HANA and non-HANA based applications. In an embodiment, the data access protocol service link (e.g., OData® based URL) is generated automatically. Accordingly, the target data can be used and reused by many different applications.

In an embodiment, the target-setting application is comprised of a designing component and a run-time component. The designing component can be used to create a planning function. In an embodiment, the planning function is a unique identification of the data source, time granularity, dimensions (e.g., a company) and measure (e.g., revenue) for which the target values are to be maintained. In an embodiment, maintaining the target values in just one time granularity is enough to aggregate the target values for other time granularities. Time granularity options available include, e.g., Weekly, Daily, Monthly, Quarterly, Yearly. In an embodiment, the dimensional granularity (e.g., vertical and/or horizontal divisions in a company) depends on the contents of the data source on which the planning function is defined. Further, during the designing component of the target-setting application, the planned target values can be either aggregated ("Bottom-Up") or distributed "Top-Down") among the selected granularities (i.e., hierarchies) of the selected dimension, in real-time. Further, the planned target values can be distributed among the hierarchies either equally or in pre-defined ratios.

In an embodiment, the target-setting application provides for visualizing, in real-time, the planned target data in a graphical format. In an embodiment, the graphical representation is provided alongside the tabular inputs of actual data (thus, facilitating the planned target versus actual data comparison). Further, the user can also perform hypothetical analysis by providing extra parameters (e.g., growth percentage).

The run-time component of the target-setting application provides an auto-generated data access protocol service link (e.g., OData® based URL) of the target data. This data access protocol service link (e.g., OData® based URL) can be consumed by analytic tools (e.g., SAP® Smart Business, SAP® Business Objects Explorer, etc.) to provide extensive analysis on planned values. Further, the target-setting application provides for comparing the planned target values against the actual data as well as filtering the analysis based on time and other provided dimensions by varying the filter parameters for the data access protocol service link (e.g., OData® based URL).

FIG. 1 illustrates an embodiment of a system utilizing the target setting graphical user interface application. In an embodiment, the system 100 consists of a user 101, a target setting application ("APP") 102, a processor 103 (with a display), a network 104, a server 105 and databases 106 (e.g., an in-memory database), and an external application ("APP") 107.

Figure 2:
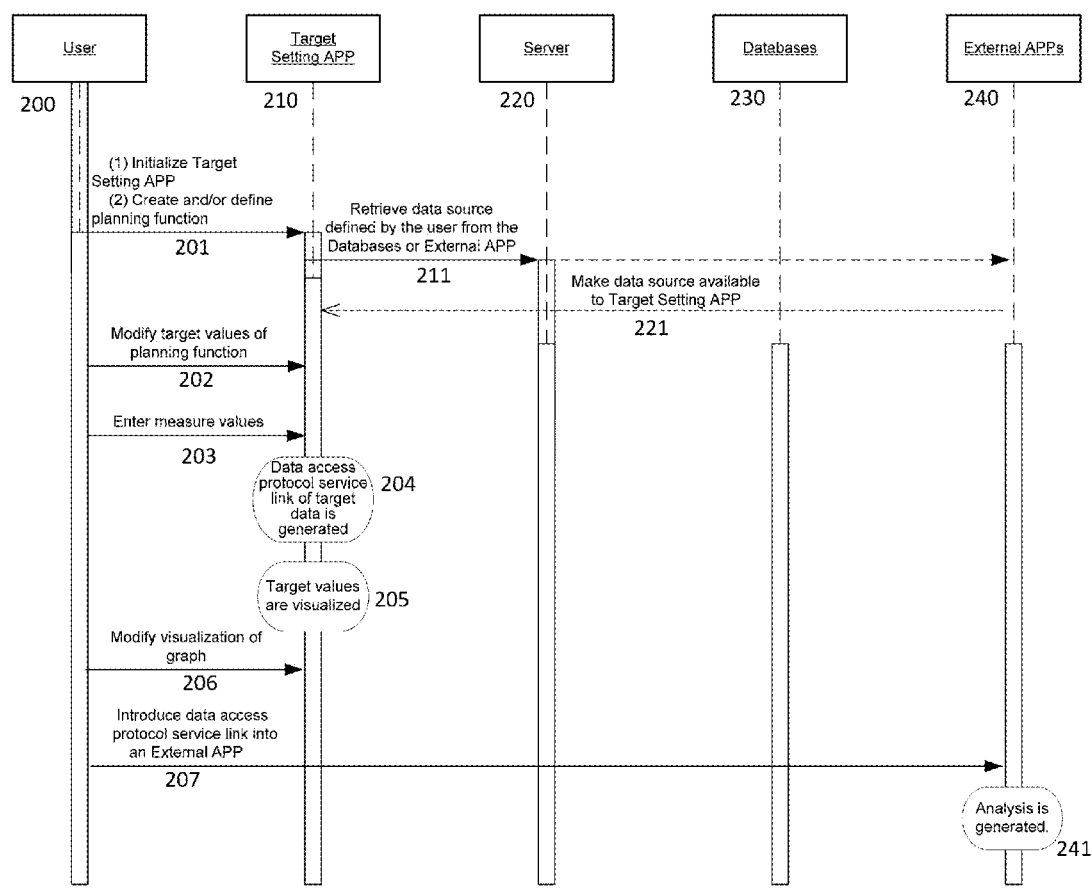
FIG. 2 illustrates an embodiment of the interaction between the elements of the system.

FIG. 2 illustrates an embodiment of the interaction between the elements of the system. In an embodiment, in step 201, user 200 initializes the Target Setting APP 210 and creates and/or defines a planning function. To define the planning function, the user inputs (1) a data source, (2) time granularity, (3) dimension(s) and (4) measure(s). In step 211, the Target Setting APP 210 retrieves the data source defined by the user from the databases 230. In step 221, the databases 230 provide the data source to Target Setting APP 210. In an another embodiment, the data source can also come from External APPs 240 as long as the external data source is exposed by an analytical data access protocol service (e.g., OData®) providing metadata with clear Dimension and Measure segregation. In step 203, the user 200 further provides/modifies the target values of the planning function. For example, depending on the contents of the data source retrieved, the user 200 can provide/modify the values and granularity of the dimension. In addition, the user 200 is also able to provide the start and end time, as well as the time granularities, of the planning function. Then in step 203, the user 200 enters the desired target values for the measure component. The user 200 will be able to enter as many values as the timing granularity and dimension granularity allow. For example, if the timing granularity is weekly, the user will only be able to enter a measure value for each week of the planning function period. Further, with regard to the dimension granularity, the user can separately enter the measure values for each component of the dimension or have the target-setting application distribute the planned target values equally (or in specific ratios) from the measure target value inputted for the parent component. In step 204, the Target Setting APP 210 automatically generates a data access protocol service link (e.g., OData® based URL) of the target data. Then, in step 205, the target data is visualized in a graphical format. The graph of the visual data is real-time responsive to any changes made to the target data. For example, changing the time granularity or time period of the planning function will automatically be depicted in the graph as the change is occurring. Likewise, collapsing or expanding the granularities of the dimension(s) will also be depicted automatically in the graph. In step 207, the user 200 takes the data access protocol service link (e.g., OData® based URL) and provides it to an external APP 240 for consumption. Lastly, in step 241, an analysis, on the target data, is generated at the external APP 240.

Figure 3A:
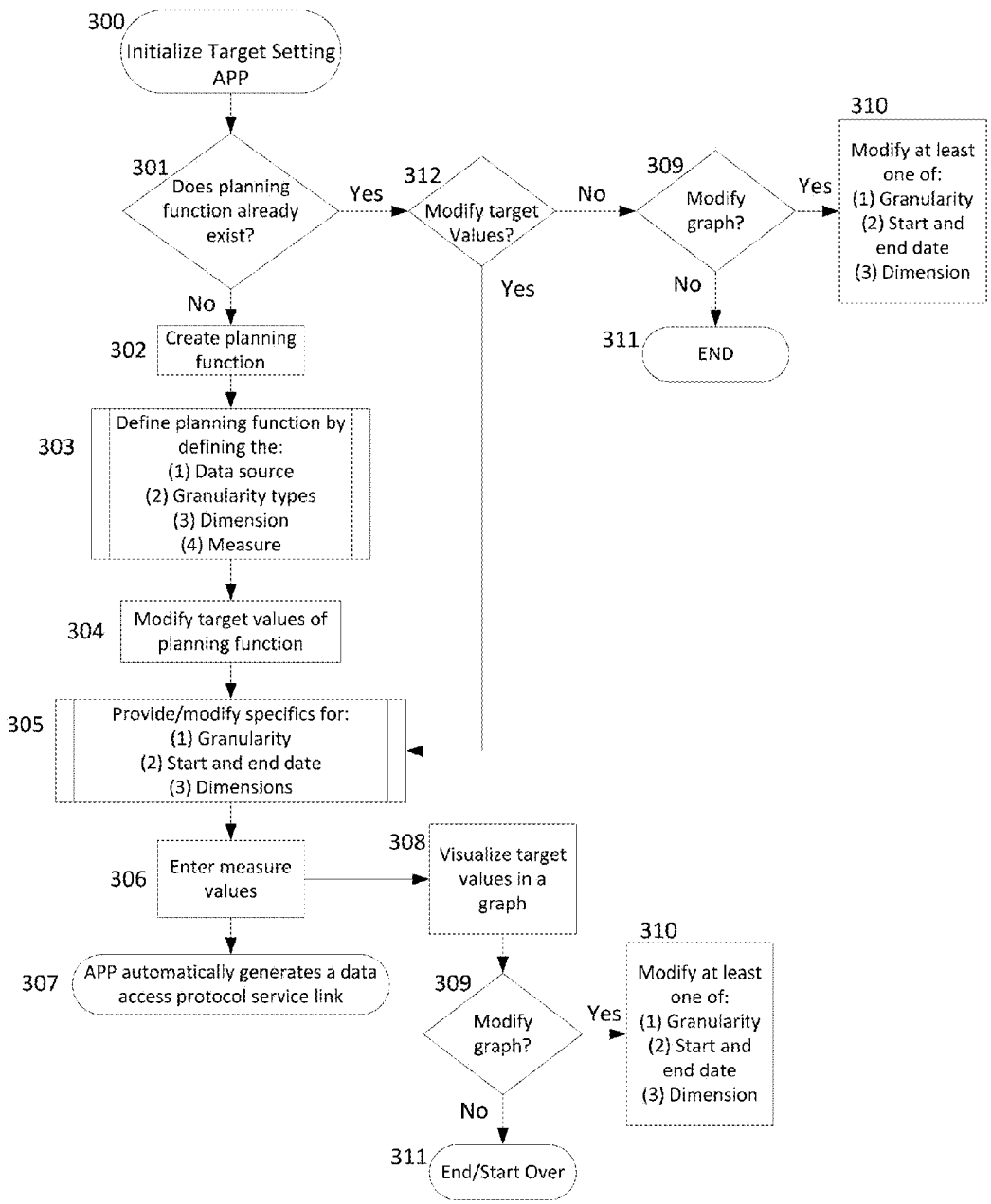
FIG. 3A illustrates an embodiment of a method of utilizing the target setting graphical user interface application.

FIG. 3A illustrates an embodiment of a method of utilizing the target setting graphical user interface application. In step 301, it is determined if a planning function already exists. If a planning function does exist, the process goes to step 312, which will be discussed later. If a planning function does not exist, then in step 302, the creation of the planning function is initiated. Accordingly, in step 303, the planning function is defined by inputting the (1) data source, (2) time granularity, (3) dimension(s) and (4) measure(s). After the planning function is defined, in step 304, the user further provides/modifies the target values of the planning function. Accordingly, in step 305, specifics for the (1) time granularity, (2) start and end date of the planning function and (3) dimensions (and the granularities thereof) are provided and/or modified. In step 306, the target measure values of the planning function are entered. In step 307, the Target Setting APP automatically generates a generic data access protocol service link (e.g., OData® based URL) of the target data in the planning function. Then, in step 308, the target data is visualized in a graphical format. In step 309, the user is presented with the option of modifying the graph of the target data. If the user chooses to modify the graph, in step 310, the user has the option of modifying at least one of (1) the time granularity, (2) start and end date, and (3) the dimension(s). The graph of the target data is real-time responsive to any changes made to the target values. For example, changing the time granularity or time period of the planning function will automatically be depicted in the graph as the change is occurring. Likewise, collapsing or expanding the granularities of the dimension(s) will also be depicted automatically in the graph. However, if the user does not choose to modify the graph, in step 311, the user can either restart the process or end it.

Going back to step 301, if the planning function does exist, then, in step 312, the user is presented with the option of modifying the target values. If the user chooses to modify the target values, then the method proceeds to step 305 (which was discussed previously). If the user does not choose to modify the target values, then the method proceeds to step 309, which was discussed previously.

Figure 3B:
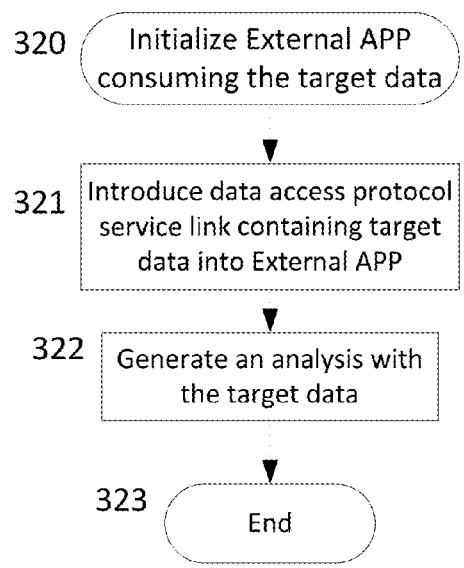
FIG. 3B illustrates an embodiment of a method of utilizing the target data in an external application.

FIG. 3B illustrates an embodiment of a method of utilizing the target data in an external application ("APP"). In step 320, the external APP (which will consume the target data) is initialized. In step 321, the data access protocol service link (e.g., OData® based URL) containing the target data is introduced into the external APP. In step 322, the user generates an analysis including the target data with the external APP. In step 323, the process ends.

Figure 4B:
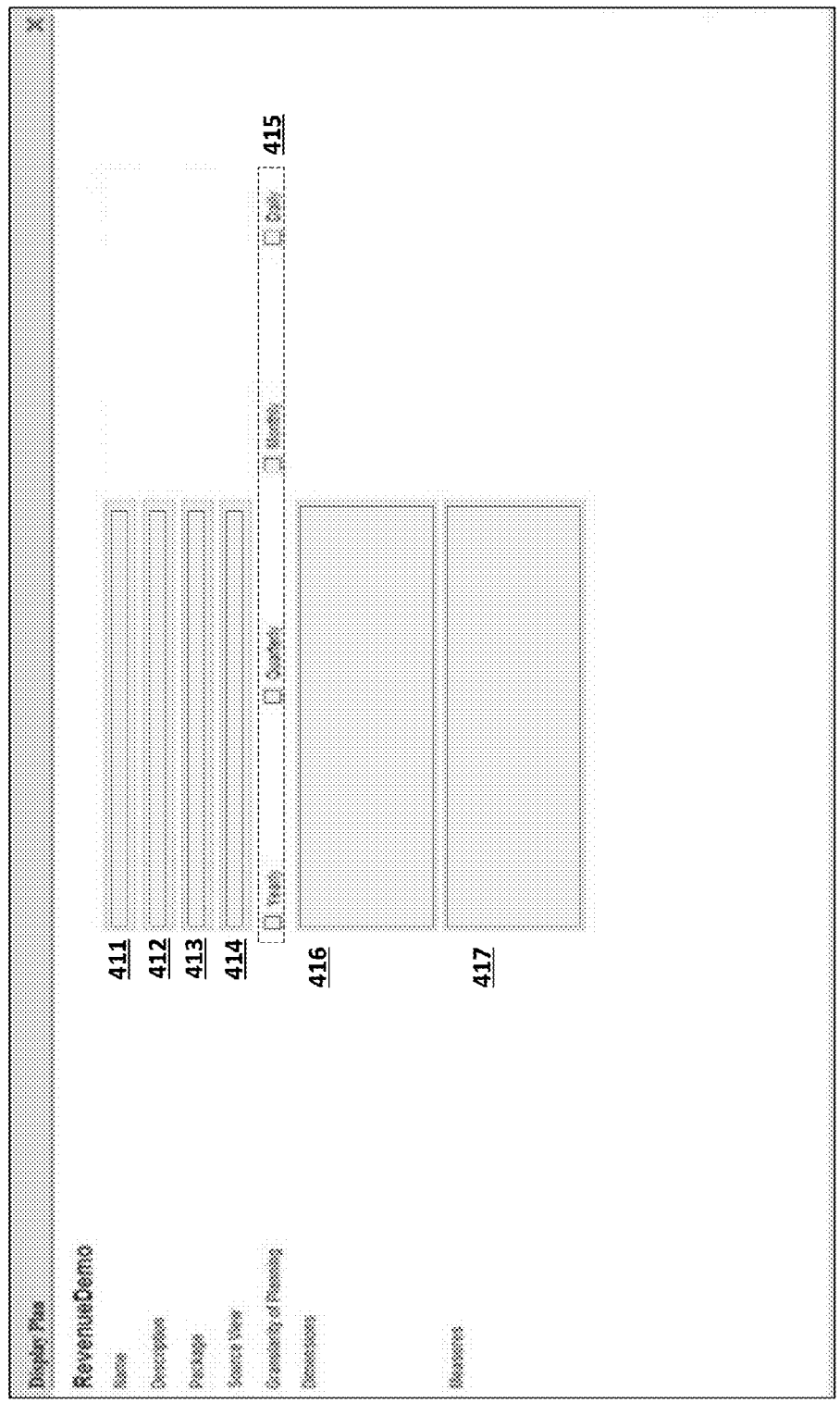
FIG. 4B illustrates an embodiment of a page utilized to define the planning function of the graphical user interface application.

FIG. 4A illustrates an embodiment of the home page of the graphical user interface application. The home page 401 of the graphical user interface application 400 includes a history 402 of the previous planning functions created, a create button 403, a display button 404, a delete button 405, a graph area 406 of the selected planning function, and a graph modifier area 407. As their names indicate, create button 403 is used to create a new planning function and delete button 405 is used to delete a selected planning function. Display button 404 is used to display the definition of the selected planning function. In other words, when the user selects the display button for a certain planning function, a separate page (i.e., FIG. 4B, 410) containing the definition of the planning function (e.g., (1) data source, (2) granularity, (3) dimension(s) and (4) measure(s)) is displayed. In an embodiment, when the user selects either the create button 403 or the display button 404, the same page (i.e., FIG. 4B, 410) is displayed. However, when the create button 404 is selected, the page does not contain any entries. The graph area 406 contains the graphical representation of the selected planning function. The visualization of graph area 406 is dependent on the attributes selected in the graph modifier area 407. The graph modifier area 407 contains a granularity modifier 407a, a dimension modifier 407b, a time period modifier 407c and the data access protocol service link (e.g., OData® based URL) 407d. The granularity modifier 407a modifies the graphical representation of the selected planning function based on the selected time granularity. Further, when the timing granularity is modified, the target measure values of the planning function are distributed (or aggregated) according to the new timing granularity (either equally or in specific ratios). Likewise, the time period modifier 407c modifies the start and end date of the graphical representation of the selected planning function. Further, changing either the time granularity or time period of the planning function will be automatically displayed in the graph 406 as the change is occurring. The dimension modifier 407b modifies the graphical representation of the planning function depending on the granularity of the dimension. The target values of the planning function can be either aggregated ("Bottom-Up") or distributed 'Top-Down') among the selected granularities (i.e., hierarchies) of the selected dimension. For example, two sub-components can be collapsed into a parent component and vice versa. Further, the target values of the planning function can be distributed (or aggregated) among the sub-components (or components) either equally or in specific ratios. In an embodiment, collapsing or expanding the granularities of the dimension(s) will be depicted automatically in the graph 406. The data access protocol service link (e.g., OData® based URL) 407d is available to be copied and consumed later by an external application.

FIG. 4B illustrates an embodiment of a page utilized to define the planning function of the graphical user interface application. As mentioned previously, display page 410 of the graphical user interface application 400 is displayed when either the create button 403 or the display button 404 is selected. Display page 410 includes a name input field 411, a description input field 412, a package input field 413, a data source input field 414, a time granularity input field 415, a dimension(s) input field 416 and a measure(s) input field 417. With regard to the dimensions input field 416, the users input a desired dimension type (i.e., company, country or material). In an embodiment, multiple dimensions can be input into the dimensions input field 416. With regard to the measures input field 417, the users input a desired measure type (i.e., revenue, profit or amount).

FIG. 4C illustrates an embodiment of a page utilized to provide/modify target values of a dimension as well as the desired time period and granularity. After the planning function is defined in display 410, the user is able to specify the dimensions (and granularities thereof) in target setting tab 420 of the graphical user interface application 400. Target setting tab 420 includes a dimensions values input field 421 and details input field 422. With the dimensions values input field 421, the user is able to provide with specificity the value of the dimension as well as the value of its subcomponents. For example, if the dimension for the planning function is "company," then the value of the dimension can be the company's name, such as "SAP SE." Further, additional sub-components of the dimension can be the names of other companies. The details input field 422 includes a summary field 423, set dimension button 424, time input field 425 and a submit button 426. Summary field 423 includes the name, data source and measure (aka "Key Figure") of the selected planning function. Set dimension button 424 initiates the dimensions values input field 421. Time input field 425 allows the user to input the granularity as well as the start and end date of the planning function. Lastly, with the submit button 426, the user submits the modified/provided values discussed above.

Figure 4D:
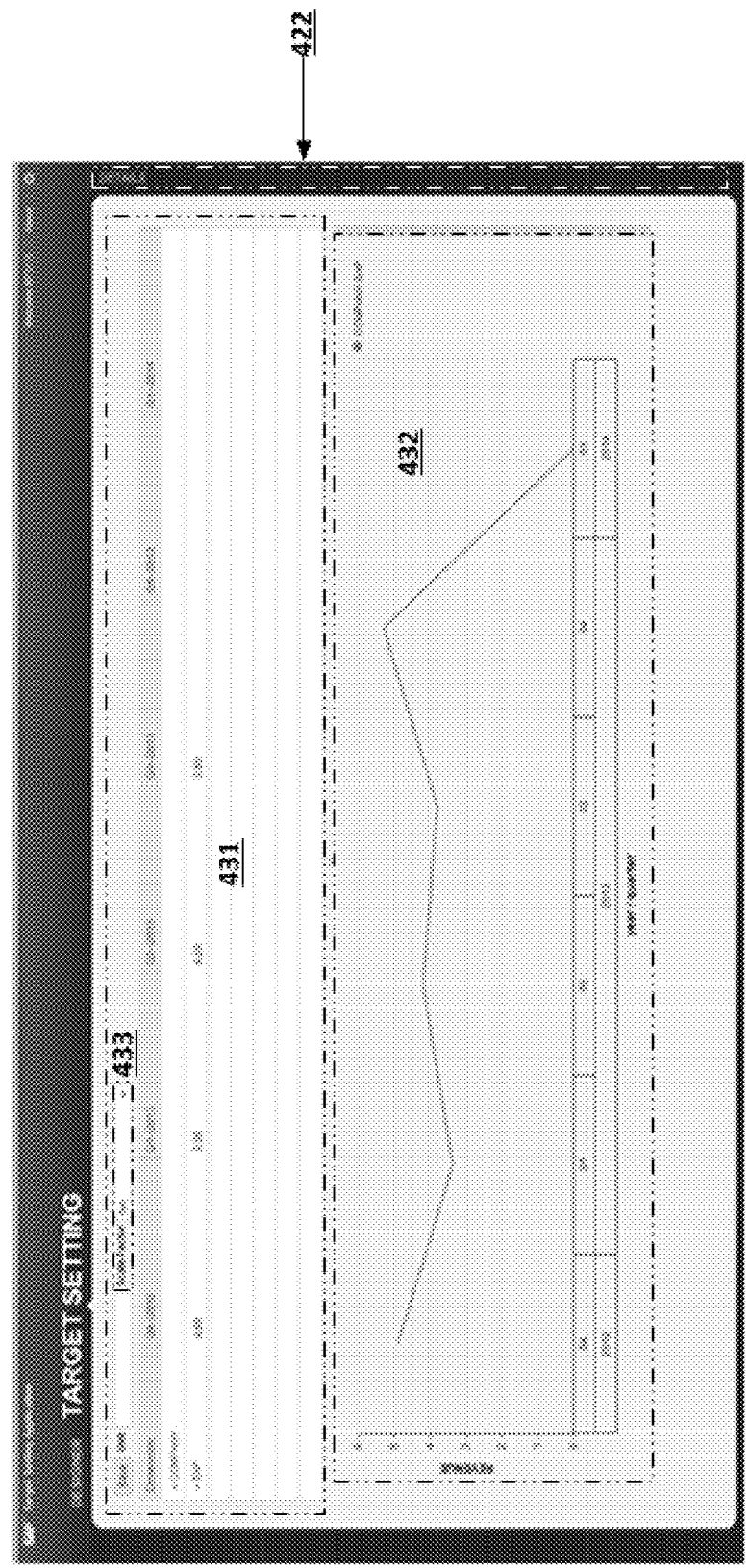
FIG. 4D illustrates an embodiment of a page utilized to input the target measure values of the planning function and visualize the planning function.

FIG. 4D illustrates an embodiment of a page utilized to input the target measure values of the planning function and visualize the planning function. Target setting tab 420 also includes a graph page 430. Graph page 430 includes an input field 431 for the user to input the specific measure target values. The user will be able to enter as many target measure values as the timing granularity and dimension granularity allow. For example, if the timing granularity is "Weekly," the user will only be able to enter a target measure value for each week of the planning function period. Further, with regard to the dimension granularity, the user can separately enter the target measure values for each component of the dimension or have the target-setting application 400 either distribute the planned target values equally or in specific ratios from the target value inputted for the collapsed dimension. Graph page 430 also includes a graph area 432 as well as a collapsed details input field 422. The graph 432 is real-time responsive to any changes made to the target data. For example, changing the time granularity or time period of the planning function (e.g., in details input field 422) will automatically be depicted in the graph 432 as the change is occurring. Likewise, collapsing or expanding the granularities of the dimension(s) (e.g., in the input field 431) will also be depicted automatically in the graph 432. Graph page 430 also includes scale input field 433. Scale input field 433 allows the user to perform hypothetical analysis on the planning function by providing extra parameters (e.g., growth percentage). Referring backing to FIG. 4D, the x-axis of graph 432 depicts a period from Oct. 1, 2013 to Mar. 31, 2014, wherein the granularity is "Quarterly." Further, y-axis depicts the target measure values input to input field 431, wherein the target measure values represent the measure of the planning function (in this case, "Revenue").

Figure 4E:
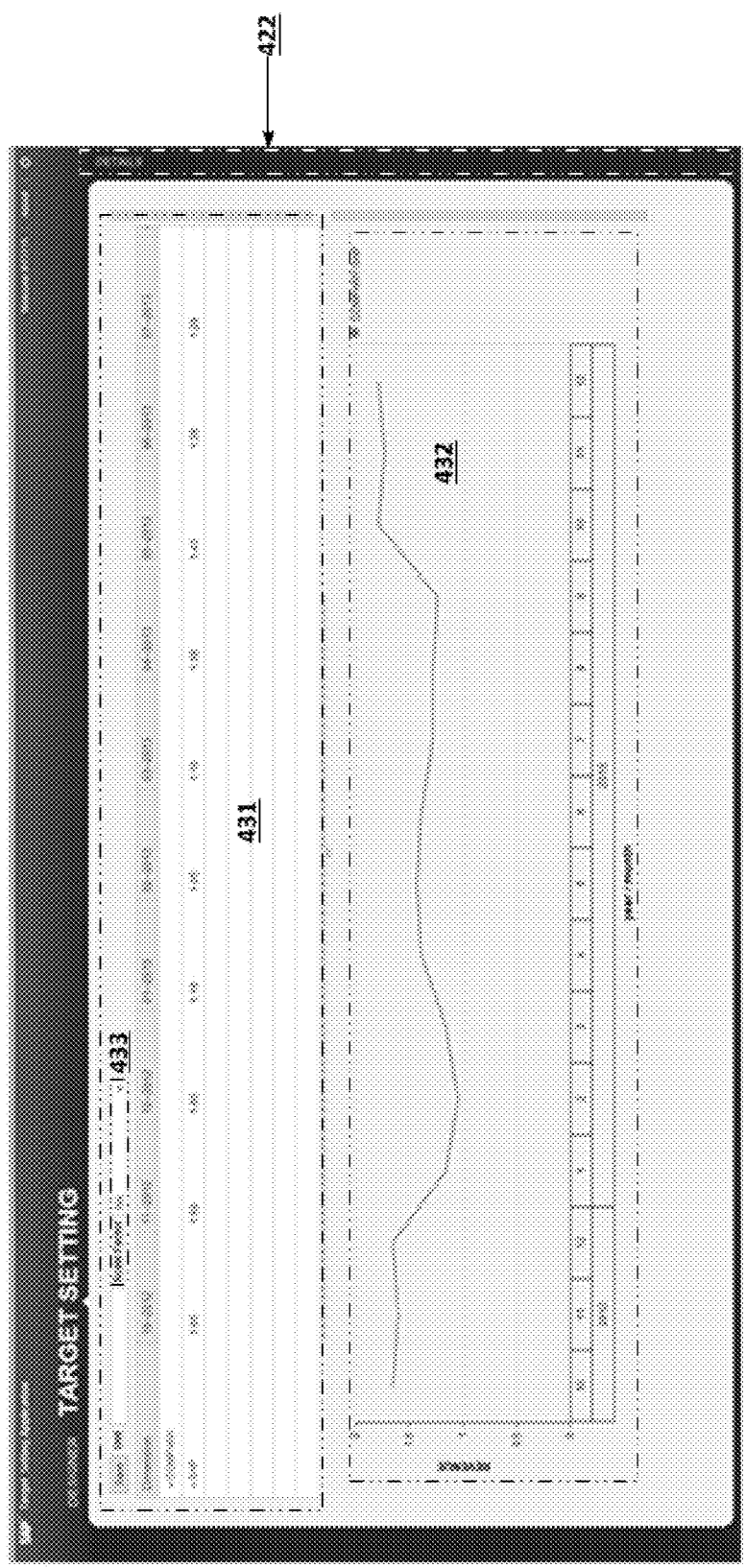
FIG. 4E illustrates an embodiment of the page described in FIG. 4D with a different time granularity.

FIG. 4E illustrates an embodiment of the page described in FIG. 4D with a different time granularity. FIG. 4E is similar to FIG. 4D except that the granularity has been changed to "Month." Further, as a result of changing the granularity to "Month," the target measure values input into input field 431 were split accordingly.

Figure 4F:
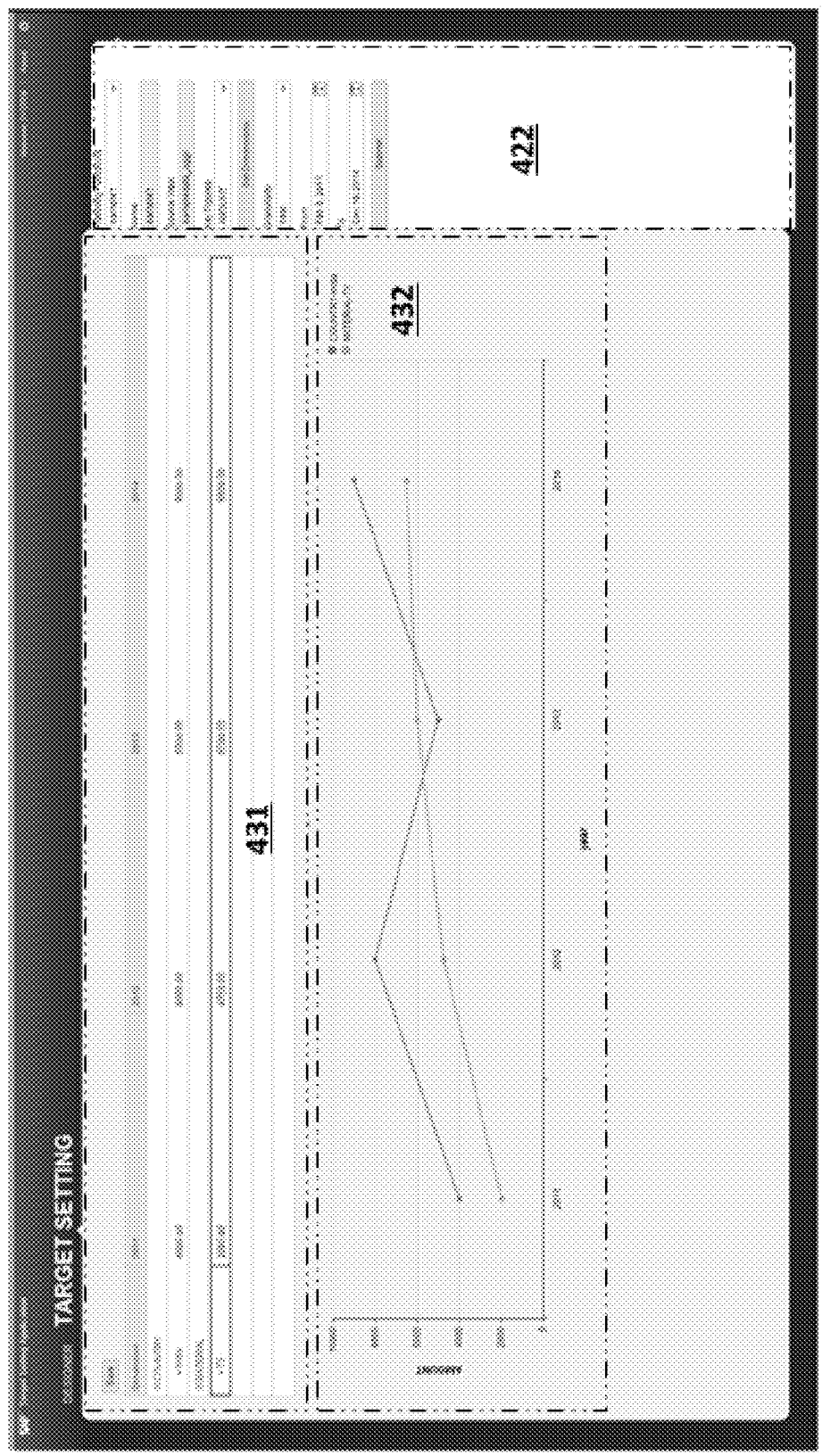
FIG. 4F illustrates an embodiment of the page utilized to input the target measure values of the planning function and visualize the planning function, with multiple dimensions.

FIG. 4F illustrates an embodiment of the page utilized to input the target measure values of the planning function and visualize the planning function, with multiple dimensions. In FIG. 4F, the input field 422 includes entries for two dimensions, (1) Country (wherein the country is India) and (2) Material (wherein the material is TV). Further, as can be seen from the graph 432 and the details input field 422, the granularity for the planning function is "Year," the time period of the planning function is from Feb. 9, 2011 to Dec. 18, 2014 and the measure or "key figure" of the planning function is "Amount."

Figure 4G:
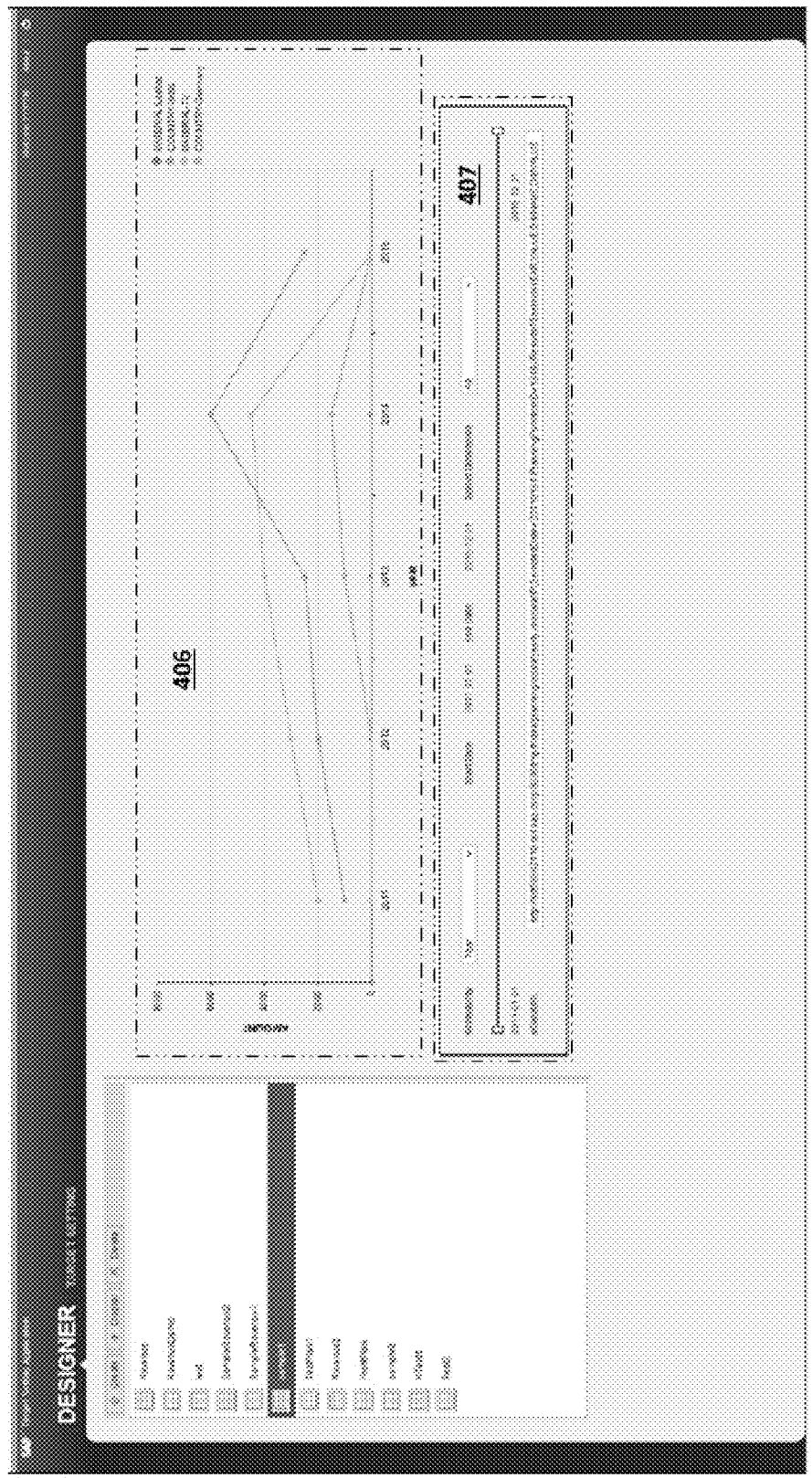
FIG. 4G illustrates an embodiment of the home page where the planning function includes multiple dimensions and subcomponents.

FIG. 4G illustrates an embodiment of the home page where the planning function includes multiple dimensions and subcomponents. In FIG. 4G, the graph 406 includes two dimensions (each with two sub-components). One dimension, Material, includes subcomponents (1) laptop and (2) TV. The second dimension, Country, includes subcomponents (1) India and (2) Germany. Further, as depicted by graph 406 and the graph modifier area 407, the granularity for the planning function is "Year," the time period of the planning function is from Jan. 1, 2011 to Dec. 12, 2015, and the measure is "Amount."

Figure 4H:
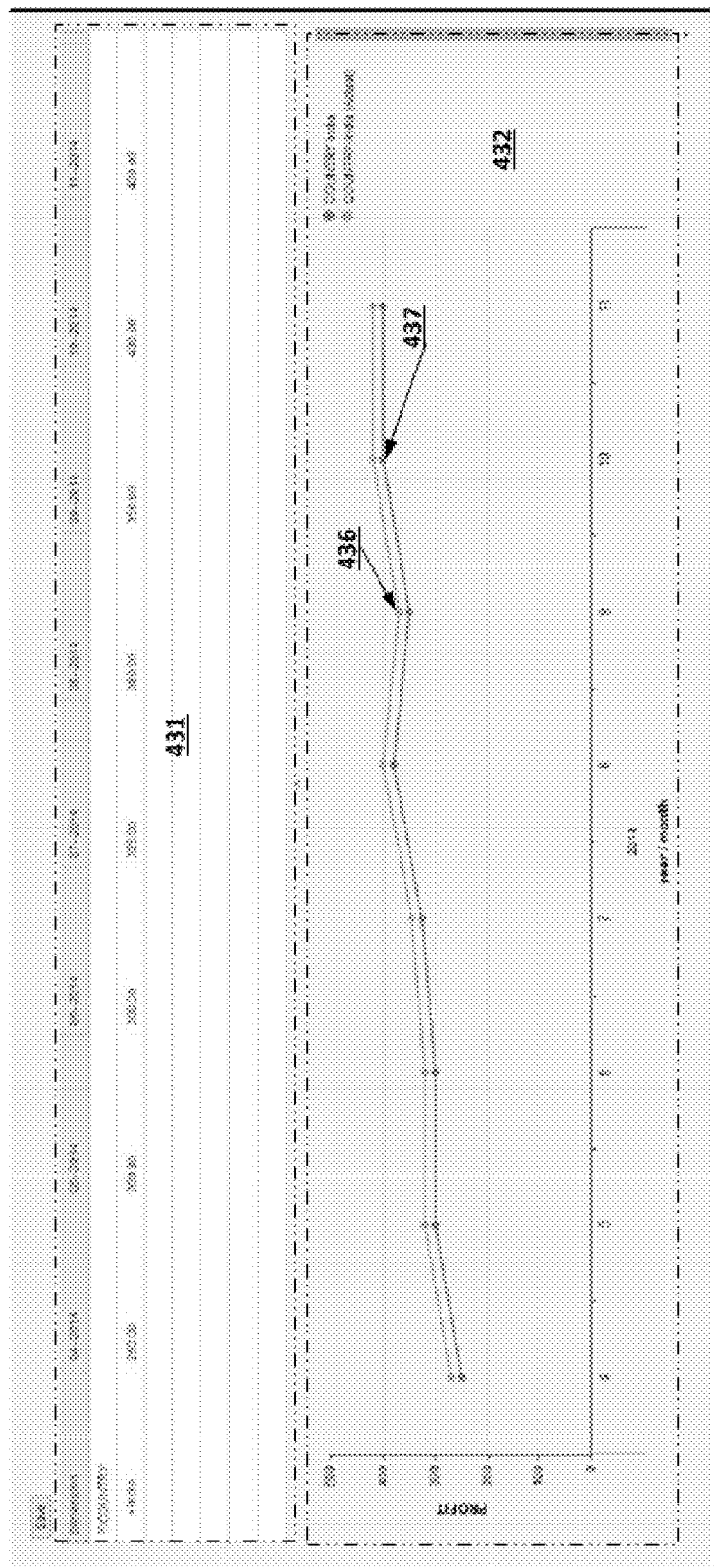
FIG. 4H illustrates an embodiment of a page utilized to compare the target measure values of the planning function with actual values.

FIG. 4H illustrates an embodiment of an application utilized to compare the target measure values of the planning function with actual values. In an embodiment, the application utilized to compare the target values of the planning function with actual values can be the same target setting application used to create the planning function or it can be an external application that consumes the target data through the data access protocol service link (e.g., OData® based URL). In FIG. 4H, the target-setting application used to create the planning function is used to compare the target data to the actual data. As depicted in input field 431 and graph 432, target values 436 and actual values 437 are being compared on a time granularity of "Month" and a time period from April 2014 to November 2014, wherein the dimension being compared is Country (specifically, India) and the measure being compared is "Profit."

Figure 5:
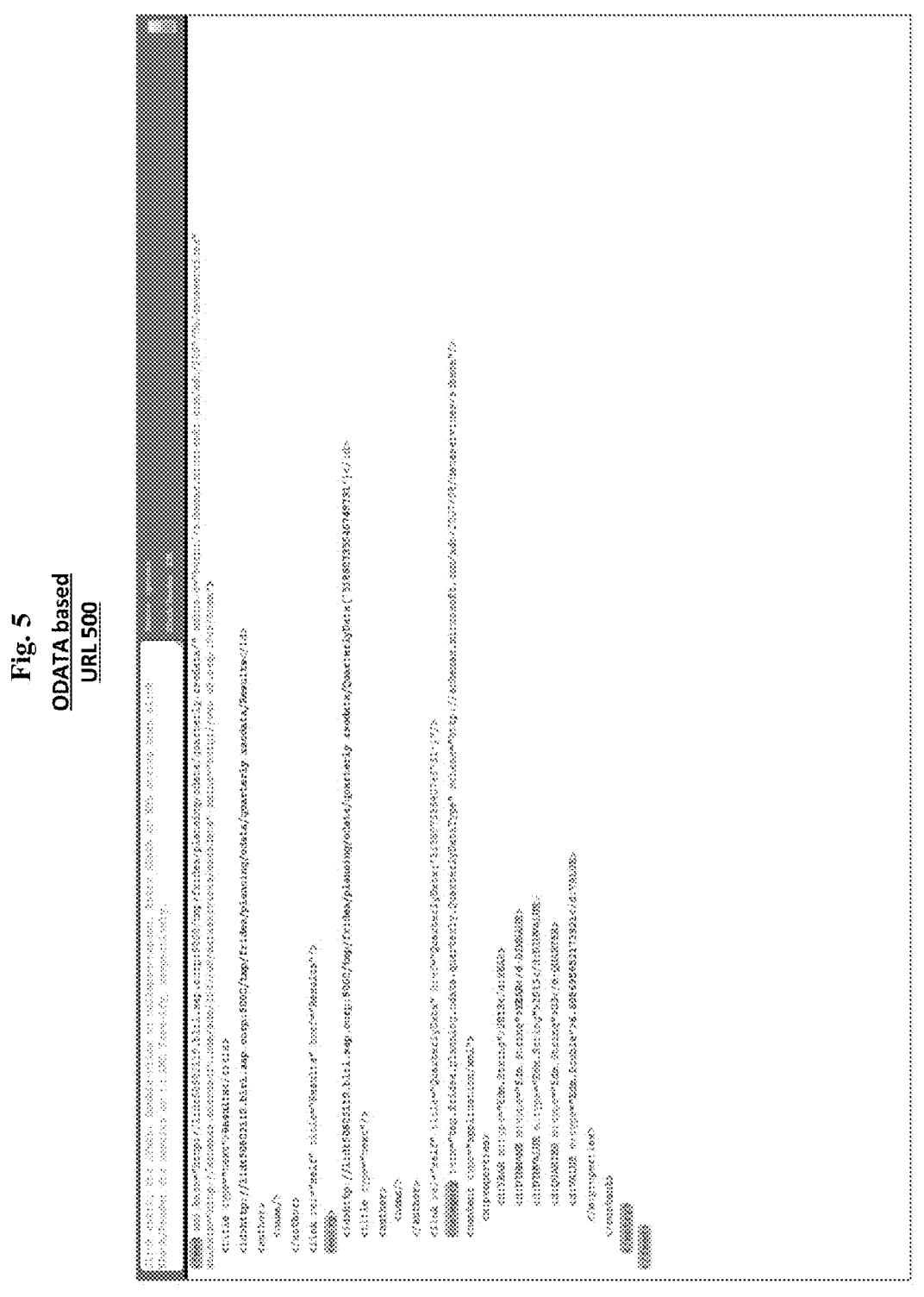

FIG. 5 illustrates an embodiment of the data access protocol service link (e.g., OData® based URL) generated by the graphical user interface application to be consumed by other applications. Once the planning function is generated, the target data can be consumed by external applications with the OData® based URL.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Although the foregoing invention has been described in some detail for purposes of clarity of understanding, it will be apparent that certain changes and modifications can be practiced within the scope of the appended claims. The described embodiment features can be used with and without each other to provide additional embodiments of the present invention. The present invention can be practiced according to the claims without some or all of these specific details. For the purpose of clarity, technical material that is known in the technical fields related to the invention has not been described in detail so that the present invention is not unnecessarily obscured. It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

What is claimed is:

1. A computer-implemented method for creating target values with a first graphical user interface application on a cloud-based system:

retrieving, with a processor, a remote data source from a database;

displaying, on the first graphical user interface application on the cloud-based system, a graphical representation of the target values, wherein the target values are a function of user-defined inputs for: the data source, at least one dimension from the data source, at least one instance of the at least one dimension from the data source, a key figure on which the at least one dimension from the data source is measured, time period of the target values and a time granularity of the time period; and generating, with the processor, a data access protocol service link including the target values, wherein the data access protocol service link is based on the user-defined inputs for: the data source, the at least one dimension from the data source, the least one instance of the at least one dimension from the data source, the key figure on which the at least one dimension from the data source is measured, the time period of the target values and the time granularity of the time period;

wherein the data access protocol service link, when activated, allows heterogeneous applications to consume data exposed by the link from the data source;

wherein, if the data source is retrieved from an external database, the data source is exposed by an analytical service providing metadata with clear dimension and measure segregation.

2. The method of claim 1, wherein the data source is retrieved from an in-memory database.

3. The method of claim 1, wherein the graphical representation of the target values is responsive, in real time, to changes to at least one of: expanding or collapsing the instances of the dimensions in the first graphical user interface application, modifying the time period of the target values, and modifying the time granularity of the time period.

4. The method of claim 3, wherein, in response to at least one of: expanding or collapsing the instances of the dimensions in the first graphical user interface application or modifying the time granularity of the time period, the target values are split or aggregated according to a predefined ratio.

5. The method of claim 1, wherein the data access protocol service link is consumed by the first graphical user interface application to perform an analysis on the target values.

6. The method of claim 1, wherein the data access protocol service link is consumed by a second graphical user interface application, distinct from the first graphical user interface application, to perform an analysis on the target values.

7. A non-transitory computer readable medium containing program instructions for creating target values with a first graphical user interface application on a cloud-based system, wherein execution of the program instructions by one or more processors of a computer system causes one or more processors to carry out the steps of:
  retrieving a remote data source from a database;
  displaying, on the first graphical user interface application of the cloud-based system, a graphical representation of the target values, wherein the target values are a function of user-defined inputs for: the data source, at least one dimension from the data source, at least one instance of the at least one dimension from the data source, a key figure on which the at least one dimension from the data source is measured, time period of the target values and a time granularity of the time period; and
  generating a data access protocol service link including the target values, wherein the data access protocol service link is based on the user-defined inputs for: the data source, the at least one dimension from the data source, the least one instance of the at least one dimension from the data source, the key figure on which the at least one dimension from the data source is measured, the time period of the target values and the time granularity of the time period;
  wherein the data access protocol service link, when activated, allows heterogeneous applications to consume data exposed by the link.

8. The non-transitory computer readable medium of claim 7, wherein the data source is retrieved from an in-memory database.

9. The non-transitory computer readable medium of claim 7, wherein the data source is retrieved from an external database, wherein the data source from the external database is exposed by an analytical service providing metadata with clear dimension and measure segregation.

10. The non-transitory computer readable medium of claim 7, wherein the graphical representation of the target values is responsive, in real time, to changes to at least one of: expanding or collapsing the instances of the dimensions in the first graphical user interface application, modifying the time period of the target values, or modifying the time granularity of the time period.

11. The non-transitory computer readable medium of claim 10, wherein, in response to at least one of: expanding or collapsing the instances of the dimensions in the first graphical user interface application, or modifying the time granularity of the time period, the target values are split or aggregated according to a predefined ratio.

12. The non-transitory computer readable medium of claim 7, wherein the data access protocol service link is consumed by the first graphical user interface application to perform an analysis on the target values.

13. The non-transitory computer readable medium of claim 7, wherein the data access protocol service link is consumed by a second graphical user interface application, distinct from the first graphical user interface application, to perform an analysis on the target values.

14. A system directed to creating target values with a first graphical user interface application on a cloud-based system, comprising of:
  a database;
  a display;
  a processor, wherein the process is configured to perform the steps of:
    retrieving a remote data source from the database;
    displaying, on the first graphical user interface application of the cloud-based system on the display, a graphical representation of the target values, wherein the target values are a function of user-defined inputs for: the data source, at least one dimension from the data source, at least one instance of the at least one dimension from the data source, a key figure on which the at least one dimension from the data source is measured, a time granularity of the time period; and
    generating a data access protocol service link including the target values, wherein the data access protocol service link is based on the user-defined inputs for: the data source, the at least one dimension from the data source, the least one instance of the at least one dimension from the data source, the key figure on which the at least one dimension from the data source is measured, the time period of the target values and the time granularity of the time period;
  wherein the data access protocol service link, when activated, allows heterogeneous applications to consume data exposed by the link from the data source.

15. The system of claim 14, further comprising an in-memory database and wherein the data source is retrieved from the in-memory database.

16. The system of claim 14, wherein the data source is retrieved from an external database, wherein the data source from the external database is exposed by an analytical service providing metadata with clear dimension and measure segregation.

17. The system of claim 14, wherein the graphical representation of the target values is responsive, in real time, to changes to at least one of: expanding or collapsing the instances of the dimensions in the first graphical user interface application, modifying the time period of the target values, or modifying the time granularity of the time period.

18. The system of claim 17, wherein, in response to at least one of: expanding or collapsing the instances of the dimensions in the first graphical user interface application, or modifying the time granularity of the time period, the target values are split or aggregated according to a predefined ratio.

19. The system of claim 14, wherein the data access protocol service link is consumed by at least one of: the first graphical user interface, or a second graphical user interface application, distinct from the first graphical user interface application, to perform an analysis on the target values.

* * * * *